United States Patent
Zen et al.

(10) Patent No.: US 6,186,633 B1
(45) Date of Patent: Feb. 13, 2001

(54) INTEGRATED INSTRUMENT CLUSTER AND FUSE BLOCK

(75) Inventors: Djuini S. Zen, Ann Arbor; Thomas C. Vanderlaan, Grand Blanc, both of MI (US)

(73) Assignee: Visteon Global Technologies, Inc., Dearborn, MI (US)

( * ) Notice: Under 35 U.S.C. 154(b), the term of this patent shall be extended for 0 days.

(21) Appl. No.: 09/252,194

(22) Filed: Feb. 18, 1999

(51) Int. Cl.[7] .............................. G01D 11/28; F21V 8/00

(52) U.S. Cl. .................. 362/23; 362/26-30; 362/23; 362/551; 362/489; 362/481; 362/559; 362/459; 362/487; 362/488; 302/27; 116/286; 240/1

(58) Field of Search ................... 362/26–30, 23, 362/551, 489, 481, 559, 459, 487, 488; 302/27; 116/286; 240/1

(56) References Cited

U.S. PATENT DOCUMENTS 5,695,269 * 12/1997 Lippmann et al. .................. 362/27
5,997,161 * 12/1999 Stringfellow et al. ............. 362/489

* cited by examiner

Primary Examiner—Sandra O'Shea
Assistant Examiner—Anabel M Ton
(74) Attorney, Agent, or Firm—Leslie C. Hodges

(57) ABSTRACT

An integrated instrument cluster assembly for use in an instrument panel 400, the assembly comprising: (1) a generally flat instrument cluster appliqué 110 having a first surface 112, an opposed second surface 114, and a perimeter 116 thereabout; (2) a generally flat light pipe/diffuser 120 sandwiched against the second surface 114 of the appliqué; and (3) at least one generally flat circuit board 130 sandwiched against the light pipe/diffuser. The at least one circuit board 130 is/are disposed such that a first rigid edge card connector portion 140 thereof extends outward generally beyond the perimeter 116.

12 Claims, 3 Drawing Sheets

US 6,186,633 B1

INTEGRATED INSTRUMENT CLUSTER AND FUSE BLOCK

BACKGROUND OF THE INVENTION

1. Field of the Invention

The present invention relates generally to electrical systems for automotive vehicles, and more particularly to instrument clusters and fuse blocks for automotive vehicles.

2. Disclosure Information

It is conventional practice to design instrument panel systems, such as those found in automobiles, watercraft, airplanes, and the like, to provide an instrument cluster 100 at a first given location, and the fuse block 200 at a second, distant location, with the cluster 100 and fuse block 200 connected by a wiring harness 300 with wire harness connectors 310/320 at either end thereof. However, because it is often desirable to package more and more components in a given space, it is desirable to provide ways of reducing the amount of space such components take up. It is also desirable to reduce the number of electromechanical connections that are needed, since these are often the highest source of product/system failures.

SUMMARY OF THE INVENTION

The present invention overcomes the disadvantages of prior art approaches by providing an integrated instrument cluster assembly for use in an instrument panel. The assembly comprises: (1) a generally flat instrument cluster appliqué having a first surface, an opposed second surface, and a perimeter thereabout; (2) a generally flat light pipe/diffuser sandwiched against the second surface of the appliqué; and (3) at least one generally flat circuit board sandwiched against the light pipe/diffuser. The at least one circuit board is/are disposed such that a first rigid edge card connector portion thereof extends outward generally beyond the perimeter.

It is an object and advantage that the present invention integrates an instrument cluster with a fuse block in a way that provides an easy-to-install and easy-to-service module.

Another advantage is that the present invention takes up less space and requires fewer electromechanical connections that prior art approaches.

These and other advantages, features and objects of the invention will become apparent from the drawings, detailed description and claims which follow.

DETAILED DESCRIPTION OF THE PREFERRED EMBODIMENTS

Figure 1:
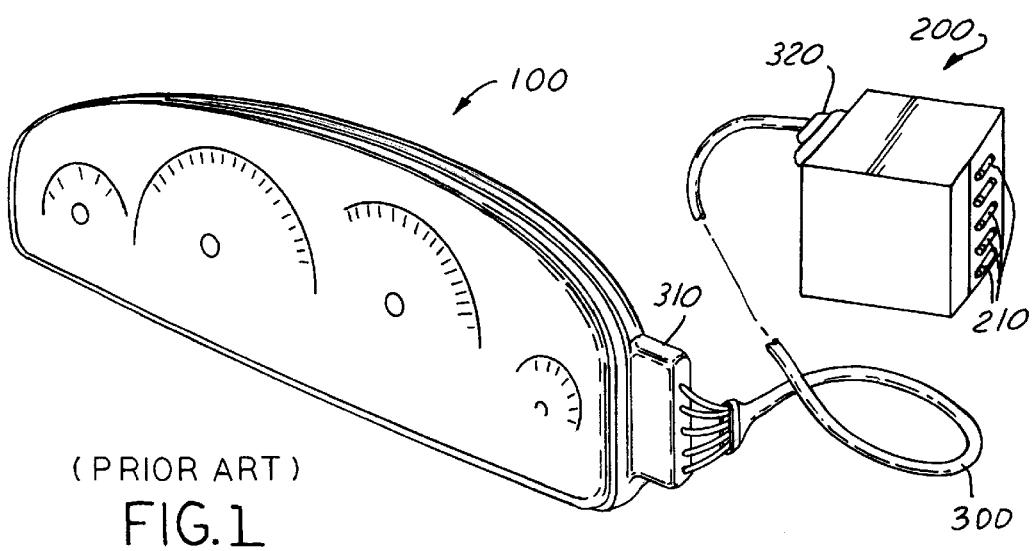
FIG. 1 is a perspective view of an instrument cluster connected to a fuse block according to the prior art.
Figure 2:
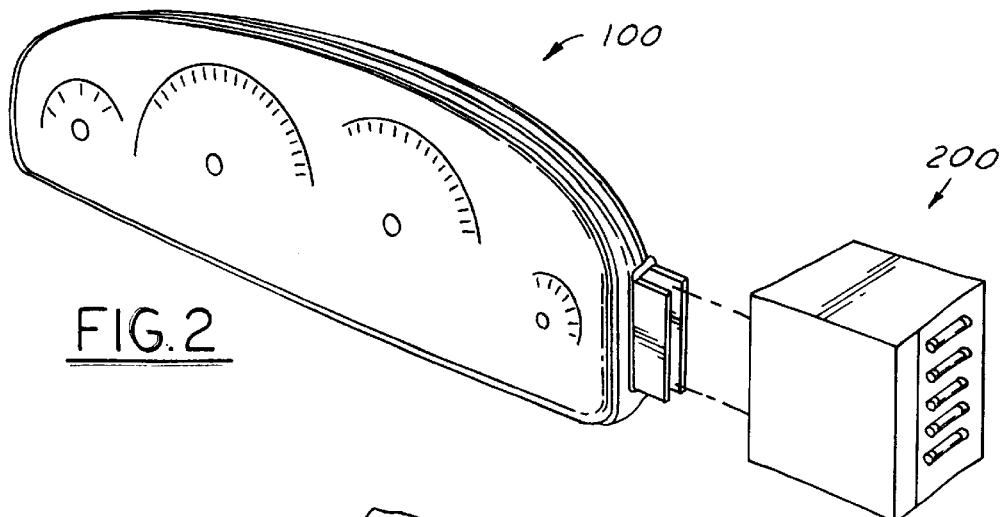
FIG. 2 is a perspective exploded view of an instrument cluster and fuse block according to the present invention.
Figure 3:
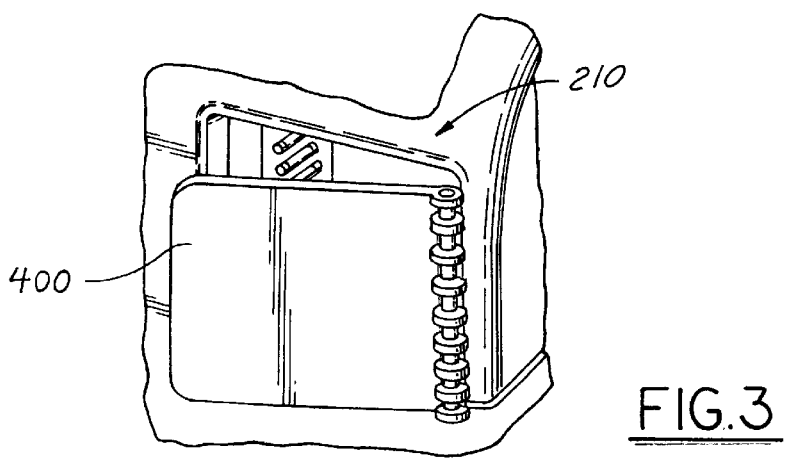
FIG. 3 is a perspective view of an instrument panel and access door therein for providing access to the fuses of the fuse block according to the present invention.

Referring now to the drawings, FIGS. 2–5 and 7 show an integrated instrument cluster assembly for use in an instrument panel 400 according to the present invention. The assembly comprises: (1) a generally flat instrument cluster appliqué 110 having a first surface 112, an opposed second surface 114, and a perimeter 116 thereabout; (2) a generally flat light pipe/diffuser 126 sandwiched against the second surface 114 of the appliqué; and (3) at least one generally flat circuit board 130 sandwiched against the light pipe/diffuser. The at least one circuit board 130 is/are disposed such that a first rigid edge card connector portion 140 thereof extends outward generally beyond the perimeter 116.

To assist the reader in understanding the present invention, all reference numbers used herein are summarized in the table below, along with the elements they represent:

100=Instrument cluster (I/C)
110=Instrument cluster appliqué
112=First surface of appliqué
114=Second surface of appliqué
116=Perimeter of appliqué/assembly
120=Light pipe/diffuser
130=Circuit board
140=Edge card connector portion
150=Lens/bezel assembly
200=Fuse block
210=Fuses
220=Female connector for receiving 140
230=Slot in connector 220 for each edge card 140
240=Electrical contacts within connector 220
300=Wiring harness
310=Wiring harness connector at I/C
320=Wiring harness connector at fuse block
400=Instrument panel The cluster assembly typically requires one or two circuit boards 130, with one being the most common. These are usually conventional FR-4 boards 130, although ceramic, flex, rigid-flex, and other types may alternatively be used. In any case, the board(s) 130 may have one or more integral portion(s) thereof which serve as the edge card connector(s) 140, or one or more separate pieces (e.g., daughter boards) may be attached to the board(s) in order to serve as the connector(s) 140. For example, if the circuit board 130 is made of polyimide flex, a rigid FR-4 daughter board may be attached thereto to serve as the edge card connector portion 140. When two or more edge card connectors 140 are used, they may lie proximate each other and extend generally parallel to and to the same extent outward as each other, in order to facilitate connection of the multiple connectors 140 with the mating fuse block connector 220. Each card connector 140 (and board 130) may be single-sided or double-sided. In order to make the most efficient, easy-to-use, and reliable type of interconnections between the edge card 140 and the fuse block connector 220 for a given number of I/O contacts, it may be preferable to use one double-sided card connector, or two single-sided connectors, rather than one single-sided connector; otherwise, when using only one single-sided card connector 140, the associated fuse block connector 220 must be very long and narrow, which would be unduly expensive to manufacture, difficult to use, and difficult to package within the available space of the instrument panel 400.

The connector portion 140 preferably extends outward generally parallel to the circuit board(s) 130, and thus generally parallel with the entire assembly sandwich. When the present invention is used in an instrument panel 400 for motor vehicles (e.g., cars, trucks, boats, etc.), it is preferable for the connector portion 140 to extend outward either to the left or to the right of the cluster (as viewed by the driver). This is because there will typically be very little room (if any) above or below the instrument panel to place the connected fuse block 200, whereas there will typically be more available room to accommodate the fuse block to the left or right of the cluster.

Figure 4:
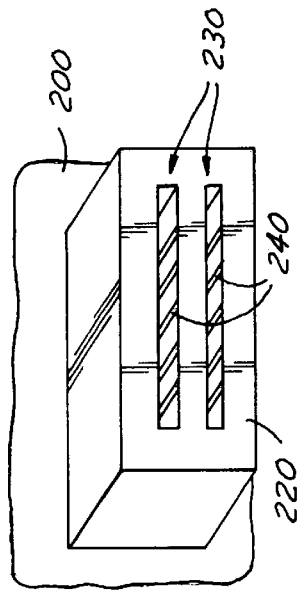
FIGS. 4–5 are perspective views of an edge card connector arrangement and a mating fuse block connector, respectively, according to the present invention.
Figure 5:
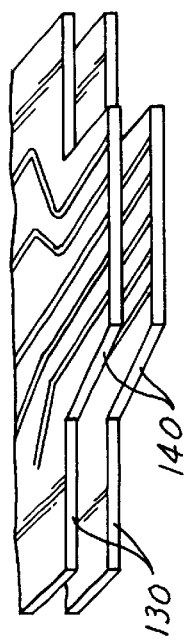
Figure 6:
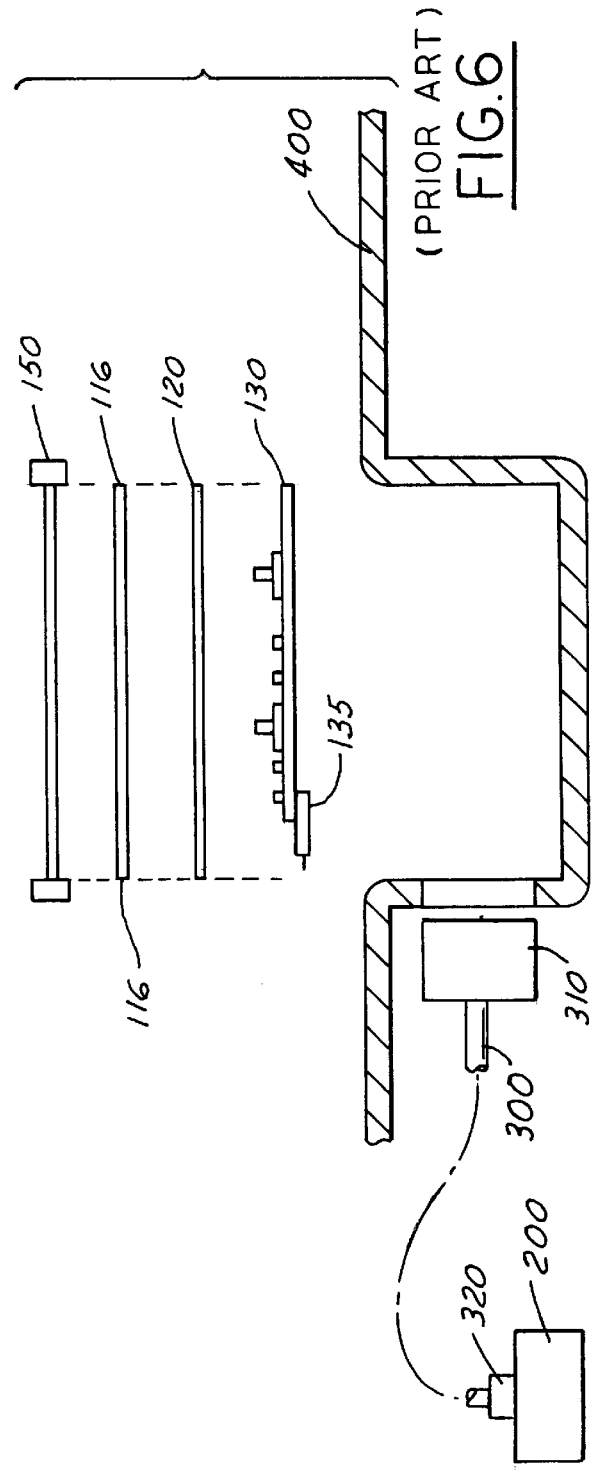
FIGS. 6–7 are top views of an instrument cluster/instrument panel according to the prior art and according to the present invention, respectively.
Figure 7:
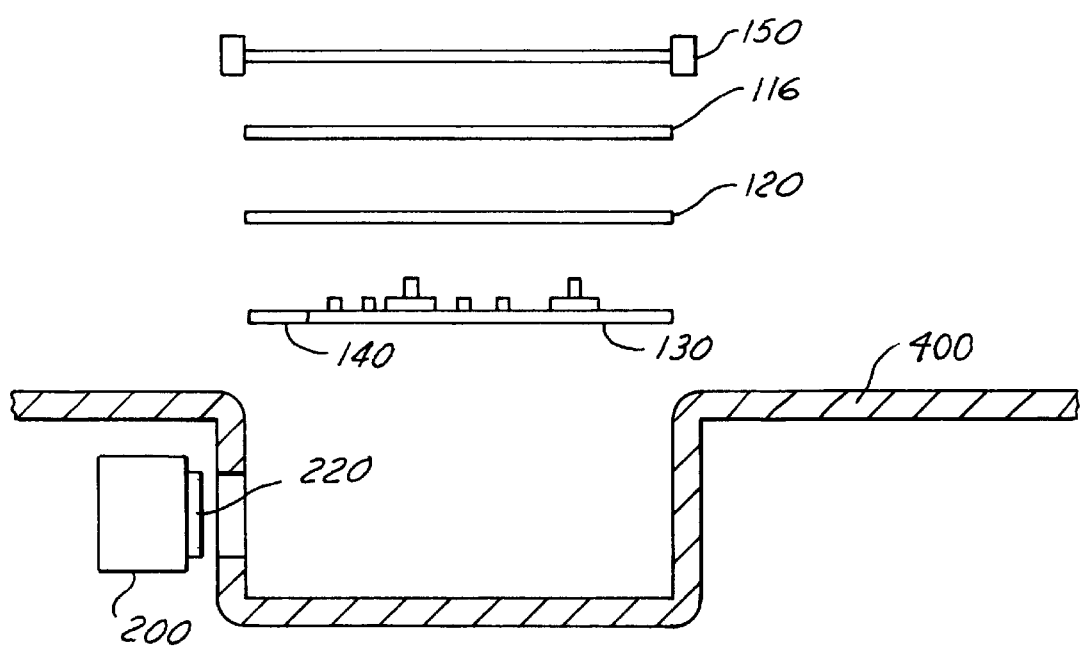

The fuse block 200 is preferably a plastic molded housing with metal frets therein for routing and connecting together various inputs, outputs, and fuses 210, as with conventional fuse blocks. However, instead of provided the fuse block with an I/O port or connector 320 that attaches to a wiring harness, the fuse block 200 of the present invention includes a female connector 220 which is adapted to receive the one or more rigid edge card connector(s) 140. FIGS. 4 and 5 illustrate an edge card arrangement and a fuse block connector 220, respectively, for two edge card connectors 140. Note that the connector 220 has a slot 230 for receiving each edge card 140, with electrical contacts 240 in each slot which correspond and mate with the respective contacts on each edge card connector 140.

Various other modifications to the present invention may occur to those skilled in the art to which the present invention pertains. For example, a bezel and lens assembly, and/or other related components, may be added to the assembly of the present invention. Other modifications not explicitly mentioned herein are also possible and within the scope of the present invention. It is the following claims, including all equivalents, which define the scope of the present invention.

What is claimed is:

1. An integrated instrument cluster assembly for use in an instrument panel, said assembly comprising:
   a generally flat instrument cluster appliqué having a first surface, an opposed second surface, and a perimeter thereabout;
   a generally flat light pipe/diffuser sandwiched against said second surface said appliqué;
   at least one generally flat circuit board sandwiched against said light pipe/diffuser, said at least one circuit board being disposed such that a first rigid edge card connector portion thereof extends outward generally beyond and contiguous with said perimeter.

2. An integrated instrument cluster assembly according to claim 1, wherein said first rigid edge card connector portion extends generally parallel to said at least one generally flat circuit board.

3. An integrated instrument cluster assembly according to claim 1, wherein said at least one generally flat circuit board further includes a second rigid edge card connector portion proximate, extending generally parallel to, and extending generally to the same extent outward as said first rigid edge card connector portion.

4. An integrated instrument cluster assembly according to claim 1, wherein said assembly has top, bottom, left, and right sides as viewed when installed in the instrument panel, wherein said edge card connector portion extends to the left or to the right of said assembly.

5. An integrated instrument cluster assembly according to claim 1, further including a bezel and lens assembly sandwiched against said first surface of said appliqué.

6. An integrated instrument cluster assembly according to claim 1, further comprising a fuse block having a female electrical connector adapted to receive said first rigid edge card connector portion.

7. An integrated instrument cluster assembly according to claim 3, further comprising a fuse block having a female electrical connector adapted to receive said first and second rigid edge card connector portions.

8. An integrated instrument cluster assembly for use in an instrument panel, said assembly comprising:
   a generally flat instrument cluster appliqué having a first surface, an opposed second surface, and a perimeter thereabout;
   a generally flat light pipe/diffuser sandwiched against said second surface of said appliqué;
   at least one generally flat circuit board sandwiched against said light pipe/diffuser, said at least one circuit board being disposed such that a first rigid edge card connector portion thereof extends outward generally beyond said perimeter; and
   a fuse block having a female electrical connector adapted to receive said first rigid edge card connector portion.

9. An integrated instrument cluster assembly for use in an instrument panel, said assembly comprising:
   a generally flat instrument cluster appliqué having a first surface, an opposed second surface, and a perimeter thereabout;
   a generally flat light pipe/diffuser sandwiched against said second surface of said appliqué;
   at least one generally flat circuit board sandwiched against said light pipe/diffuser, said at least one circuit board being disposed such that first and second rigid edge card connector portions thereof extend outward generally beyond said perimeter, wherein said second rigid edge card connector portion is proximate, extends generally parallel to, and extends generally to the same extent outward as said first rigid edge card connector portion; and
   a fuse block having a female electrical connector adapted to receive said first and second rigid edge card connector portions.

10. An integrated instrument cluster assembly for use in an instrument panel, said assembly comprising:
    a generally flat instrument cluster appliqué having a first surface, an opposed second surface, and a perimeter thereabout;
    a generally flat light pipe/diffuser sandwiched against said second surface said appliqué;
    at least one generally flat circuit board sandwiched against said light pipe/diffuser, said at least one circuit board being disposed such that a first rigid edge card connector portion thereof extends outward generally beyond said perimeter; and
    a bezel and lens assembly sandwiched against said first surface of said appliqué.

11. An integrated instrument cluster assembly for use in an instrumental panel, said assembly comprising:
    a generally flat instrument cluster appliqué having a first surface, an opposed second surface, and a perimeter thereabout;
    a generally flat light pipe/diffuser sandwiched against said second surface said appliqué;
    at least one generally flat circuit board sandwiched against said light pipe/diffuser, said at least one circuit board being disposed such that a first rigid edge card connector portion thereof extends outward generally beyond said perimeter; and
    a fuse block having a female electrical connector adapted to receive said first rigid edge card connector portion.

12. An integrated instrument cluster assembly for use in an instrument panel, said assembly comprising:

a generally flat instrument cluster appliqué having a first surface, an opposed second surface, and a perimeter thereabout;

a generally flat light pipe/diffuser sandwiched against said second surface said appliqué;

at least one generally flat circuit board sandwiched against said light pipe/diffuser, said at least one circuit board being disposed such that a first rigid edge card connector portion thereof extends outward generally beyond said perimeter and said generally flat circuit board includes a second rigid edge card connector portion proximate, extending generally parallel to, and extending generally to the same extent outward as said first rigid edge card connector portion; and a fuse block having a female electrical connector adapted to receive said first rigid edge card connector portion.

* * * * *